(12) United States Patent
Gooden et al.

(10) Patent No.: US 8,434,386 B2
(45) Date of Patent: May 7, 2013

(54) COOLING A POWER TRANSFER UNIT

(75) Inventors: James Thomas Gooden, Canton, MI (US); Shaun Gordon Knowles, Canton, MI (US); Anthony Paskus, Rochester Hills, MI (US); Andrew Christopher Posa, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 13/106,945

(22) Filed: May 13, 2011

(65) Prior Publication Data

US 2012/0285290 A1 Nov. 15, 2012

(51) Int. Cl.
*F16H 57/04* (2010.01)

(52) U.S. Cl.
USPC .......................................................... 74/606 A

(58) Field of Classification Search ................ 74/606 A, 74/606 R; 464/170
See application file for complete search history.

(56) References Cited

U.S. PATENT DOCUMENTS

| | | | | |
|---|---|---|---|---|
| 5,014,741 A * | 5/1991 | Taguchi | ........................ | 184/6.12 |
| 5,034,638 A * | 7/1991 | McCabria | ........................ | 310/54 |
| 5,165,468 A * | 11/1992 | Tajima et al. | ........................ | 165/47 |
| 5,279,391 A * | 1/1994 | Ward | ........................ | 184/6.12 |
| 6,513,615 B2 * | 2/2003 | Bowen et al. | ........................ | 180/248 |
| 7,944,106 B2 * | 5/2011 | Miller et al. | ........................ | 310/112 |
| 2008/0258569 A1 * | 10/2008 | Kano et al. | ........................ | 310/51 |

* cited by examiner

*Primary Examiner* — Vicky Johnson
(74) *Attorney, Agent, or Firm* — James Dottavio; MacMillan, Sobanski & Todd, LLC

(57) ABSTRACT

A system for cooling a power transfer unit includes a case enclosing said unit and including an outer surface, a chamber bounded by said outer surface, an inlet for carrying coolant from a source of pressurized coolant into the chamber, and an outlet for carrying coolant from the chamber.

16 Claims, 3 Drawing Sheets

COOLING A POWER TRANSFER UNIT

BACKGROUND OF THE INVENTION

1. Field of the Invention

This invention relates generally to a technique for cooling a power transfer unit by flowing coolant over surface where heat can be transferred to the coolant and away from the unit.

2. Description of the Prior Art

A power transfer unit (PTU) is a mechanical device that transmits power from the output of a transmission to a driveshaft leading to the real vehicle wheels. In a vehicle whose front wheels are continually driven by the transmission, the PTU changes the direction of rotating power flow from a lateral direction to a longitudinal direction.

A recent trend in vehicle powertrain design provides all wheel drive in more vehicles and delivers more power to the wheels of a secondary axle.

The PTU is subject to temperature increase in service. Friction developed in the PTU produces internal heat. Because automotive components that operate at high temperatures, such an engine, turbocharger, engine exhaust pipe and catalytic converter, are located near each PTU in the engine compartment, the air surrounding the PTU is at high temperature, which limits potential heat transfer from the PTU to ambient air.

Conventionally no cooling system is provided to carry heat from a PTU. Therefore, heat is rejected from a PTU primarily by conduction to the transmission and convection to the surrounding air stream. But underbody shields limit heat transfer potential by reducing air movement over the PTU.

Due to these factors and conditions, the temperature of the PTU and its case are reaching levels where the functional of the PTU can be compromised or adversely affected.

As a result of transmitting more rotating power through the PTU, more heat rejection from the PTU is required to maintain its temperature at an acceptable magnitude. Consequently, a need exists in the industry for a system that cools a PTU, preferably by continually circulating coolant over surfaces of the PTU so that heat can be transferred to the coolant and away from the PTU.

SUMMARY OF THE INVENTION

A system for cooling a power transfer unit includes a case enclosing said unit and including an outer surface, a chamber bounded by said outer surface, an inlet for carrying coolant from a source of pressurized coolant into the chamber, and an outlet for carrying coolant from the chamber.

The coolant chamber occupies a large void between the transmission case and PTU. Coolant is supplied from a source of coolant at relatively low temperature.

Stiffening ribs on the outer surface of the PTU case increase the surface area in contact with coolant and redirect coolant flow for enhanced heat transfer. Cutouts in the ribs ensure coolant flow through each cavity of the coolant chamber.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
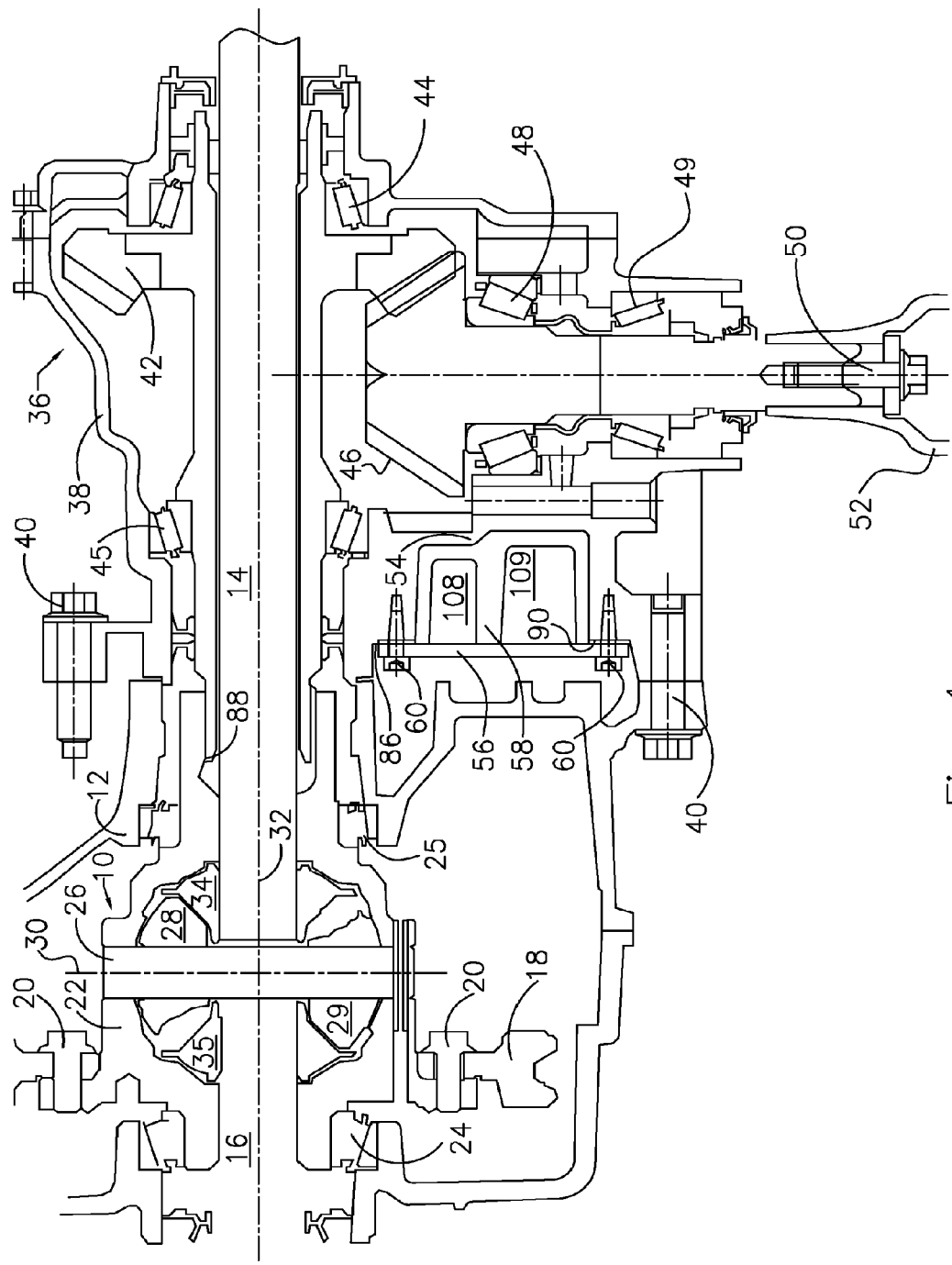
FIG. 1 is a cross section taken at a horizontal plane showing a portion of a differential mechanism and a power transfer unit.

Referring now to the drawings, FIG. 1 shows a differential mechanism 10 located in a transmission case 12, the differential being adapted to transmit rotating power to halfshafts 14, 16, which extend laterally to driven wheels located at the outboard ends of the halfshafts. A ring gear 18 of the transmission is secured by bolts 20 to the differential housing 22, which is supported on the transmission case 12 by bearings 24, 25. A spindle, 26 secured to the differential housing 22, supports bevel pinions, which rotate about axis 30 and revolve about axis 32. Side bevel gears 34, 35 meshing with bevel gears 28, 29 are secured to halfshafts 14, 16, respectively.

The PTU 36, enclosed in a PTU case 38, is secured to transmission case 12 by bolts 40. The PTU 36 includes a bevel gear 42, supported by bearings 44, 45 on the PTU case 38; a bevel gear 46 meshing with bevel gear 42 and supported by bearing 48, 49 on PTU case 38; and a bolted connection 50 to a driveshaft 52, which transmits power to a second set of wheels.

Figure 3:
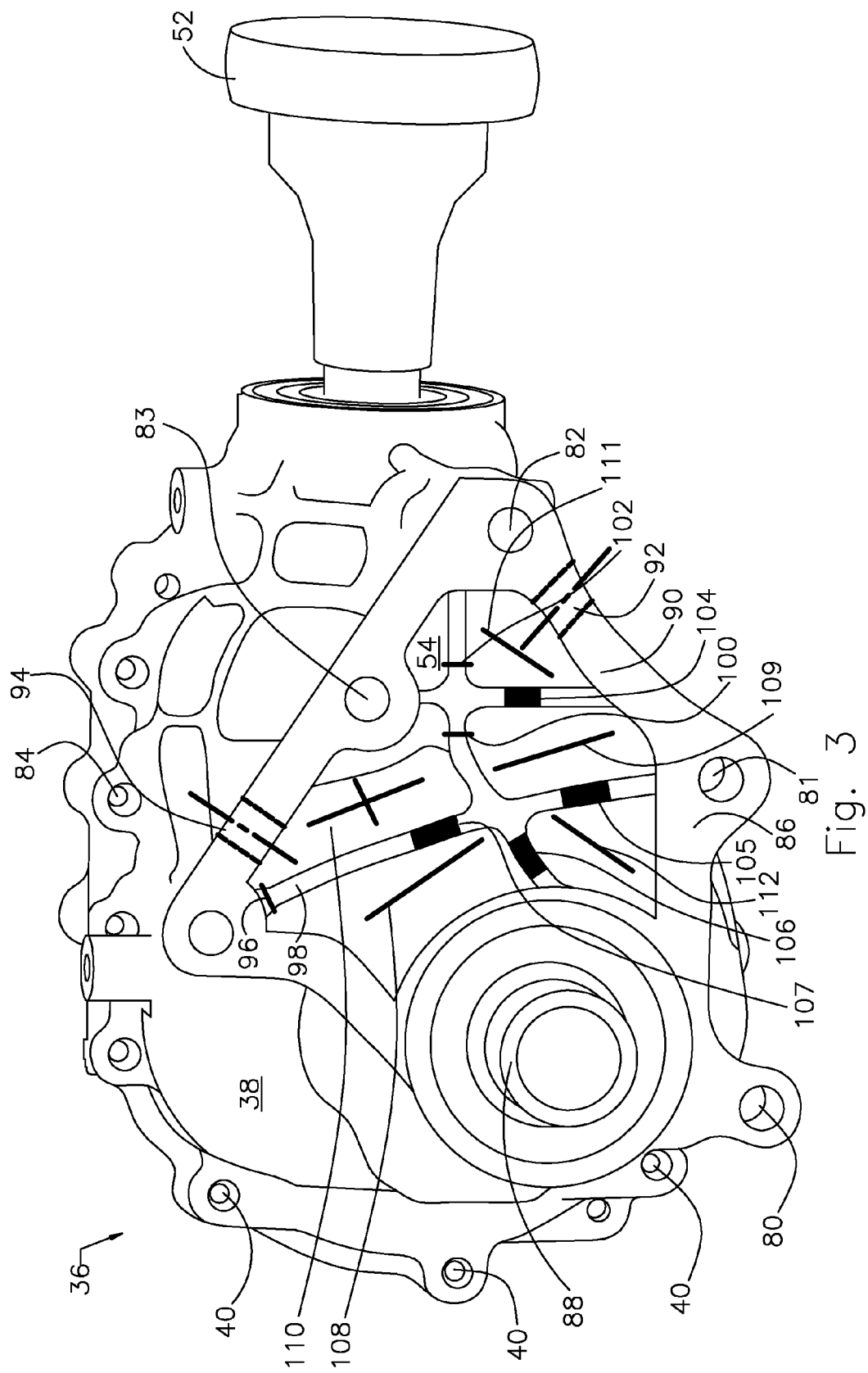
FIG. 3 is a side view showing the end face of the PTU case of FIG. 1.

FIGS. 1 and 3 show that a portion of the outer surface 54 of the PTU case 38, adjacent and facing the transmission case 12, defines a cavity bounded by the outer surface 54. A cover 56 closes an opening where the cavity faces the transmission case 12 and seals the opening against flow of coolant from a coolant chamber 58 bounded by the outer surface 54 and the cover 56. A series of bolts 60 secures cover 56 to the PTU case 38.

Figure 2:
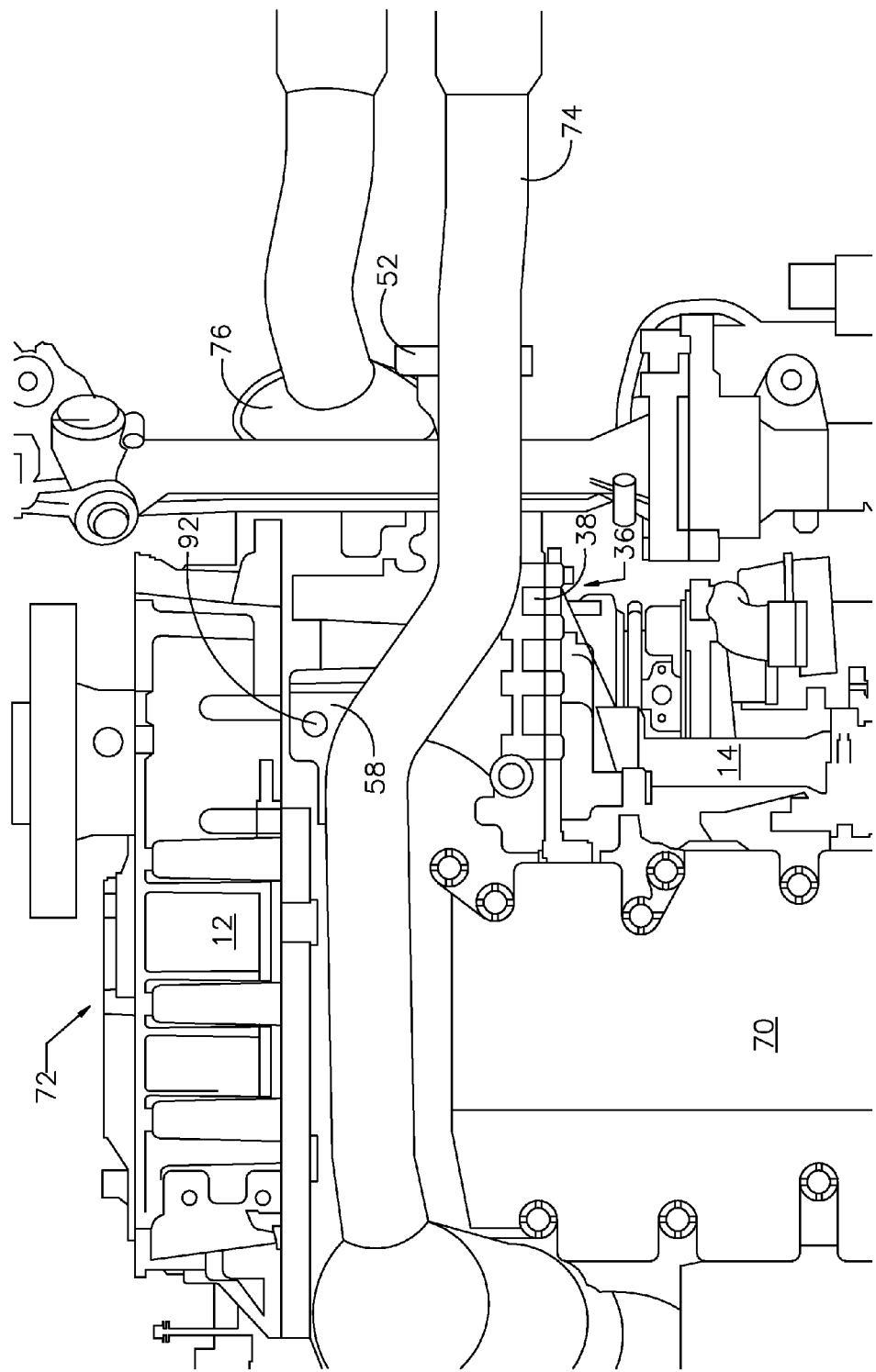
FIG. 2 is a perspective bottom view showing components of a motor vehicle installed in an engine compartment.

FIG. 2 shows that the components of a motor vehicle located in the engine compartment include an engine 70, transmission 72, PTU 36, engine exhaust pipe 74 and a catalytic converter 76. Each bolt 60 that connects the transmission case 12 to the PTU case 36 is fitted in one of the bolt holes 80, 81, 82, 83, 84 that extending through a mounting surface 86, formed at the lateral face of the PTU case 36 adjacent the transmission case 12. FIG. 3 show an external spline 88, which connects bevel pinion 42 and the differential housing 22.

Mounting surface 86 is formed with a recess 90 that extends along the inner periphery of the mounting surface and is about 2 mm. deep. Cover 56, which is fitted into recess 90, seals coolant against the PTU case 38, thereby reducing risk of cross contamination between coolant and automatic transmission fluid or coolant and PTU fluid.

An inlet port 92 and outlet port 94 allow coolant to enter and exit coolant chamber 58. Preferably inlet port 92 is located at a lower elevation than that of outlet port 94 and laterally spaced from the outlet port. Preferably outlet port 94 is located at the higher elevation to allow trapped air to rise and leave the coolant chamber 58. Air trapped in chamber presents a risk of oxidation of both coolant and the aluminum alloy of which the PTU case 38 is formed.

FIG. 3 shows that the outer surface 54 of the PTU case 38 is formed with stiffening ribs located in chamber 58 and dividing the chamber into cavities, each cavity bounded by at least one rib and the lower surface of the chamber. The ribs are used to produce turbulent flow of coolant in chamber 58, to direct coolant flow from the inlet 92 to the outlet 94, and to increase the area through which heat is transferred from the outer surface 54 of the PTU case 38 to coolant flowing in chamber 58.

A narrow passage 96 having a relatively small cross sectional area formed in rib 98, allows air to flow toward the outlet 94 and to flow across rib 98. Similar narrow passages 100, 102, each having a relatively small cross sectional area are formed in other ribs of the PTU case 38 to allow air to flow toward the outlet 94. Preferably the cross sectional area of passages 96, 100, 102 is small enough to limit coolant flow through the passages.

Coolant flows through chamber 58 from cavity-to-cavity through relatively large slots 104, 105, 106, 107 formed in the ribs. Preferably the cross sectional area of each slot 104-107 is larger than that of each passage 96, 100, 102 and is large enough to allow coolant to flow through the slots but without weakening the rib or substantially reducing stiffness of the ribs.

Cover 56 is formed with flow deflectors 108, 109, 110, 111, 112 which extend from cover 56 into chamber 58, are located in a coolant flow path between inlet 92 and slots 104-107 such that the deflectors 108-111 cause coolant entering inlet 92 and exiting each slot to flow around the adjacent deflector rather than flowing directly into another of the slots 104-107. Deflectors 108-111 further produce turbulent coolant flow along the surface of the ribs in coolant chamber 58. Preferably cover 56 fits tight against the top of the webs of PTU case 38 to ensure that coolant flows as previously described and not just leak between cavities of chamber 58 that are separated by the ribs.

Machining slots 104-107 in the ribs is less desirable than drilling holes through the ribs. Preferably the slots 104-107 are formed while casting the PTU case 38 of aluminum alloy.

In accordance with the provisions of the patent statutes, the preferred embodiment has been described. However, it should be noted that the alternate embodiments can be practiced otherwise than as specifically illustrated and described.

The invention claimed is:

1. A cooling system for a vehicle powertrain, comprising
   a case containing a differential that transmits power laterally;
   a second case containing, a power transfer unit that transmits power from the differential longitudinally;
   a chamber located in the second case, divided by ribs into cavities;
   an inlet for carrying coolant into the chamber;
   an outlet for carrying coolant from the chamber;
   a passage in one of the ribs connecting at least two of the cavities.

2. The system of claim 1 wherein the case is a transmission case, and the chamber is located between the second case and the transmission case.

3. The system of claim 1 further comprising:
   a mounting surface formed on the second case; and
   a cover secured to the mounting surface for closing the chamber.

4. The system of claim 1 further comprising:
   slots, each slot having a relatively larger cross sectional area than a cross sectional area of the passage, formed in one of the ribs and connecting at least two of the cavities, each slot carrying coolant between two of the cavities.

5. The system of claim 1 further comprising a cover secured to the second case for closing the chamber.

6. The system of claim 1 further comprising:
   slots, each slot formed in one of the ribs and connecting at least two of the cavities, each slot carrying coolant between two of the cavities; and
   flow deflectors located within the chamber and in a coolant flow path between two of the slots.

7. The system of claim 6 wherein the cover further comprises the flow deflectors, each flow deflector extending from an inner surface of the cover into the chamber.

8. The system of claim 1 further comprising:
   slots, each slot formed in one of the ribs and connecting at least two of the cavities, each slot carrying coolant between two of the cavities; and
   a flow deflector located within the chamber and in a coolant flow path between the inlet and one of the slots.

9. The system of claim 1 further comprising:
   a mounting surface formed on the second case and including a recess extending along a length of the mounting surface.

10. A cooling system for a vehicle powertrain, comprising
    a transmission case containing a differential that transmits power laterally;
    a second case containing a power transfer unit that transmits power from the differential longitudinally;
    a chamber and located in the second case;
    a cover for closing the chamber;
    an inlet for carrying coolant into the chamber;
    an outlet for carrying coolant from the chamber;
    ribs formed on the second case and dividing the chamber into cavities; and
    a passage having a cross sectional area, formed in one of the ribs and connecting at least two of the cavities.

11. The system of claim 10 further comprising a mounting surface formed on the second case, the cover being secured to the mounting surface.

12. The system of claim 10 further comprising:
    slots, each slot having a relatively larger cross sectional area than the cross sectional area of the passage, formed in one of the ribs and connecting at least two of the cavities, each slot carrying coolant between two of the cavities.

13. The system of claim 10 further comprising:
    slots, each slot formed in one of the ribs and connecting at least two of the cavities, each slot carrying coolant between two of the cavities; and
    flow deflectors located within the chamber and in a coolant flow path between two of the slots.

14. The system of claim 13 wherein the cover further comprises the flow deflectors, each flow deflector extending from an inner surface of the cover into the chamber.

15. The system of claim 10 further comprising:
    slots, each slot formed in one of the ribs and connecting at least two of the cavities, each slot carrying coolant between two of the cavities; and
    a flow deflector located within the chamber and in a coolant flow path between the inlet and one of the slots.

16. The system of claim 10 further comprising:
    a mounting surface formed on the second case and including a recess extending along a length of the mounting surface.

* * * * *